US011338528B2

(12) United States Patent
Budge et al.

(10) Patent No.: US 11,338,528 B2
(45) Date of Patent: May 24, 2022

(54) SYSTEM FOR ADDITIVELY MANUFACTURING COMPOSITE STRUCTURES

(71) Applicant: Continuous Composites Inc., Coeur d'Alene, ID (US)

(72) Inventors: Trevor David Budge, Coeur d'Alene, ID (US); Nathan Andrew Stranberg, Post Falls, ID (US); Kyle Frank Cummings, Coeur d'Alene, ID (US); Dan Budge, Harrison, ID (US)

(73) Assignee: Continouos Composites Inc., Coeur d'Alene, ID (US)

( * ) Notice: Subject to any disclaimer, the term of this patent is extended or adjusted under 35 U.S.C. 154(b) by 305 days.

(21) Appl. No.: 16/531,055

(22) Filed: Aug. 3, 2019

(65) Prior Publication Data
US 2020/0086574 A1 Mar. 19, 2020

Related U.S. Application Data

(60) Provisional application No. 62/730,541, filed on Sep. 13, 2018.

(51) Int. Cl.
*B29C 64/209* (2017.01)
*B29C 69/00* (2006.01)
(Continued)

(52) U.S. Cl.
CPC ............ *B29C 69/001* (2013.01); *B22F 10/10* (2021.01); *B29C 64/118* (2017.08);
(Continued)

(58) Field of Classification Search
CPC ... B29C 64/393; B29C 64/386; B29C 64/209; B29C 64/321; B29C 64/343; B29C 64/373
See application file for complete search history.

(56) References Cited

U.S. PATENT DOCUMENTS 3,286,305 A   11/1966   Seckel
3,809,514 A   5/1974    Nunez
(Continued)

FOREIGN PATENT DOCUMENTS

DE   4102257 A1   7/1992
EP   2589481 B1   1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Joseph S Del Sole
*Assistant Examiner* — Margaret B Hayes
(74) *Attorney, Agent, or Firm* — Ryan C. Stockett

(57) ABSTRACT

A system is disclosed for additively manufacturing a composite structure. The system may include a support, and a print head connected to and moveable by the support. The system may also include an encoder configured to generate a signal indicative of an amount of material passing through the print head, and a controller in communication with the encoder. The controller may be configured to selectively implement a corrective action in response to the signal.

20 Claims, 3 Drawing Sheets

(51) Int. Cl.

| | | |
|---|---|---|
| *B29C 64/255* | (2017.01) | |
| *B29C 64/165* | (2017.01) | |
| *B29C 64/321* | (2017.01) | |
| *B29C 64/118* | (2017.01) | |
| *B29C 64/268* | (2017.01) | |
| *B29C 64/314* | (2017.01) | |
| *B33Y 50/02* | (2015.01) | |
| *B29C 64/20* | (2017.01) | |
| *B29C 64/393* | (2017.01) | |
| *B22F 10/10* | (2021.01) | |
| *B33Y 40/00* | (2020.01) | |
| *B33Y 10/00* | (2015.01) | |
| *B33Y 30/00* | (2015.01) | |
| *B33Y 70/00* | (2020.01) | |
| *B29K 105/08* | (2006.01) | |

(52) U.S. Cl.
CPC ............ *B29C 64/165* (2017.08); *B29C 64/20* (2017.08); *B29C 64/209* (2017.08); *B29C 64/255* (2017.08); *B29C 64/268* (2017.08); *B29C 64/314* (2017.08); *B29C 64/321* (2017.08); *B29C 64/393* (2017.08); *B33Y 50/02* (2014.12); *B29K 2105/08* (2013.01); *B33Y 10/00* (2014.12); *B33Y 30/00* (2014.12); *B33Y 40/00* (2014.12); *B33Y 70/00* (2014.12)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,305,769 B1 * | 10/2001 | Thayer | B29C 64/40 347/1 |
| 6,459,069 B1 | 10/2002 | Rabinovich | |
| 6,501,554 B1 | 12/2002 | Hackney et al. | |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 * | 9/2015 | Mark | B29C 31/042 |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,052,822 B1 * | 8/2018 | Sait | B29C 64/393 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 | 4/2009 | Oldani | |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2015/0137402 A1 * | 5/2015 | Schmehl | B33Y 10/00 264/39 |
| 2015/0165677 A1 * | 6/2015 | Ho | B29C 64/106 425/136 |
| 2015/0165691 A1 * | 6/2015 | Mark | B29C 64/386 700/98 |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |
| 2016/0082641 A1 | 3/2016 | Bogucki et al. | |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0257051 A1 * | 9/2016 | Pappas | B29C 48/82 |
| 2016/0263806 A1 | 9/2016 | Gardiner | |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |
| 2016/0311165 A1 | 10/2016 | Mark et al. | |
| 2016/0325491 A1 | 11/2016 | Sweeney et al. | |
| 2016/0332369 A1 | 11/2016 | Shah et al. | |
| 2016/0339633 A1 | 11/2016 | Stolyarov et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2016/0368255 A1 | 12/2016 | Witte et al. | |
| 2017/0007359 A1 | 1/2017 | Kopelman et al. | |
| 2017/0007360 A1 | 1/2017 | Kopelman et al. | |
| 2017/0007361 A1 | 1/2017 | Boronkay et al. | |
| 2017/0007362 A1 | 1/2017 | Chen et al. | |

(56) References Cited

U.S. PATENT DOCUMENTS

| | | |
|---|---|---|
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Mark |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065309 A1* | 3/2018 | Tyler .................. B33Y 30/00 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, issue 6, pp. 3799-3805 (May 15, 2012).

* cited by examiner

SYSTEM FOR ADDITIVELY MANUFACTURING COMPOSITE STRUCTURES

RELATED APPLICATIONS

This application is based on and claims the benefit of priority from U.S. Provisional Application No. 62/730,541 that was filed on Sep. 13, 2018, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic (e.g., solid or liquid), a powdered metal, a thermoset resin (e.g., a UV curable, heat curable, and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543, which issued to Tyler on Dec. 6, 2016 ("the '543 patent").

Although CF3D® provides for increased strength, compared to manufacturing processes that do not utilize continuous-fiber reinforcement, improvements can be made to the structure and/or operation of existing systems. The disclosed additive manufacturing system is uniquely configured to provide these improvements and/or to address other issues of the prior art.

SUMMARY

In one aspect, the present disclosure is directed to an additive manufacturing system. The additive manufacturing system may include a support, and a print head connected to and moveable by the support. The system may also include an encoder configured to generate a signal indicative of an amount of material passing through the print head, and a controller in communication with the encoder. The controller may be configured to selectively implement a corrective action in response to the signal.

In another aspect, the present disclosure is directed to another additive manufacturing system. This system may include a support, a print head connected to and moveable by the support, and an encoder configured to generate a signal indicative of an amount of continuous reinforcement passing through the print head. The system may also include a cure enhancer configured to apply a cure energy to a matrix coating the continuous reinforcement, and a controller in communication with the support, the encoder, and the cure enhancer. The controller may be configured to determine an actual amount of the continuous reinforcement passing through the print head, and to make a comparison of the actual amount to a travel distance of the print head. The controller may also be configured to selectively perform at least one of the following when the comparison indicates that the actual amount is less than the travel distance: generating a notification alerting a technician of a potential malfunction, pausing a process of the print head, cancelling the process, or restarting the process.

In yet another aspect, the present disclosure is directed to a method for additively manufacturing a composite structure. The method may include discharging from a print head a path of composite material, including a continuous reinforcement at least partially coated with a matrix, and determining an amount of the composite material being pulled through the print head during discharging. The method may also include moving the print head during discharging of the composite material and determining a travel distance of the print head. The method may further include selectively implementing a corrective action based on a difference between the amount of the composite material and the travel distance.

DETAILED DESCRIPTION

Figure 1:
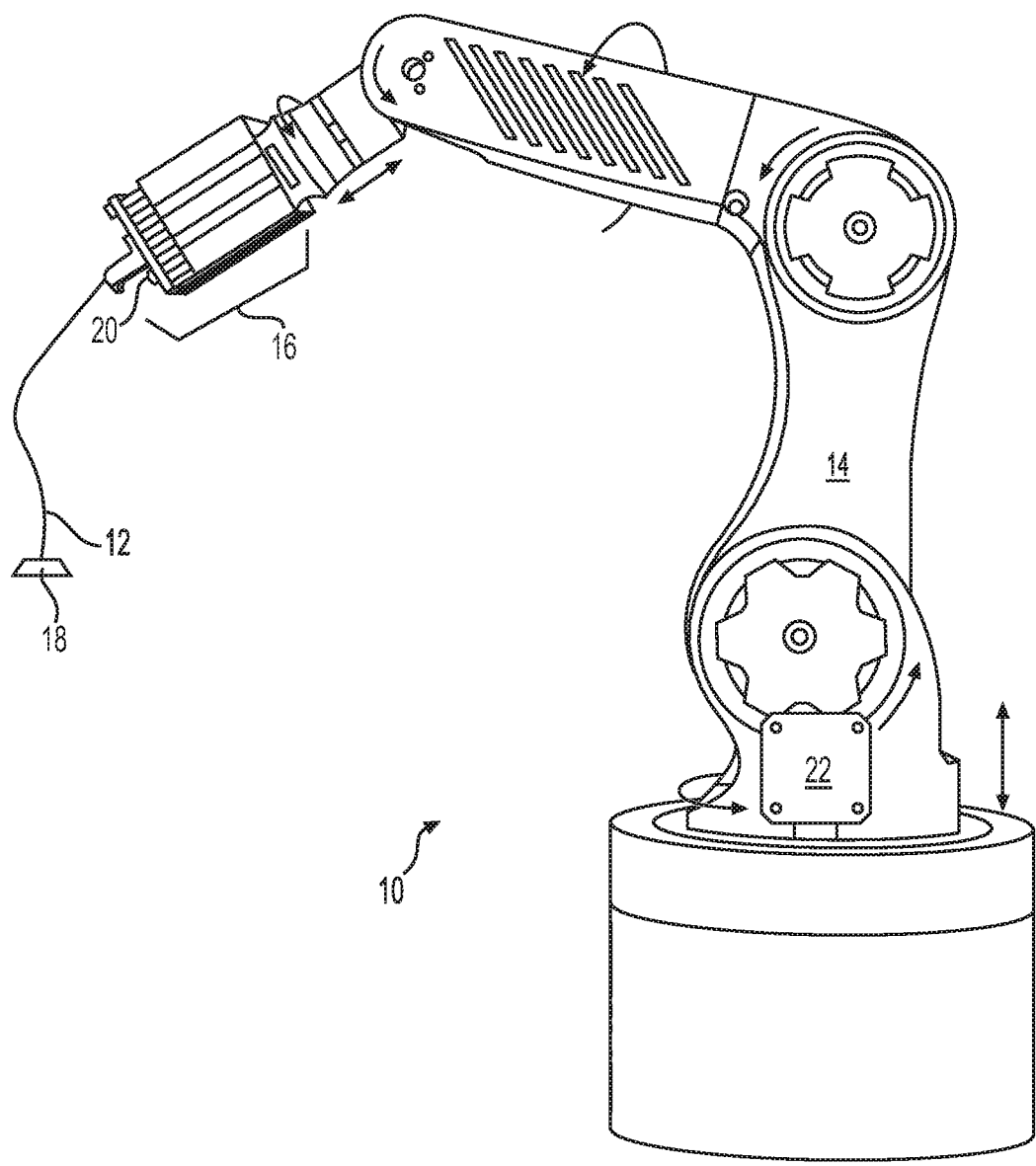
FIG. 1 is an isometric illustration of an exemplary disclosed additive manufacturing system.

FIG. 1 illustrates an exemplary system 10, which may be used to manufacture a composite structure 12 having any desired cross-sectional shape (e.g., ellipsoidal, polygonal, etc.). System 10 may include at least a moveable support 14 and a print head ("head") 16. Support 14 may be coupled to and configured to move head 16. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be a gantry, a hybrid gantry/arm, or another type of movement system that is capable of moving head 16 in multiple directions during fabrication of structure 12. Although support 14 is shown as being capable of multi-axis movement (e.g., movement about six or more axes), it is contemplated that any other type of support 14 capable of moving head 16 in the same or in a different manner could also be utilized, if desired. In some embodiments, a drive may mechanically couple head 16 to support 14 and may include components that cooperate to move and/or supply power or materials to head 16.

Head 16 may be configured to receive or otherwise contain a matrix. The matrix may include any type of material (e.g., a liquid resin, such as a zero-volatile organic compound resin; a powdered metal; a solid filament; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, reversible resins (e.g., Triazolinedione, a covalent-adaptable network, a spatioselective reversible resin, etc.) and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for similar reasons. In either situation, head 16 may be specially configured (e.g., insulated, temperature-controlled, shielded, etc.) to provide for these needs.

The matrix may be used to coat, encase, or otherwise at least partially surround or saturate (e.g., wet) any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools) or otherwise passed through head 16 (e.g., fed from one or more external spools). When multiple reinforcements are simultaneously used, the reinforcements may be of the same type and have the same diameter and cross-sectional shape (e.g., circular, square, flat, hollow, solid, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a prepreg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix material is being pulled from head 16 with the reinforcement, the resulting tension in the reinforcement may increase a strength of structure 12 (e.g., by aligning the reinforcements, inhibiting buckling, equally distributing loads, etc.), while also allowing for a greater length of unsupported structure 12 to have a straighter trajectory (e.g., by creating moments that oppose gravity).

The reinforcement may be pulled from head 16 as a result of head 16 moving away from an anchor point 18. In particular, at the start of structure-formation, a length of matrix-impregnated reinforcement may be pulled and/or pushed from head 16, deposited onto a stationary or moveable anchor point 18, and cured, such that the discharged material adheres to anchor point 18. Thereafter, head 16 may be moved away from anchor point 18, and the relative movement may cause additional reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement.

Figure 2:
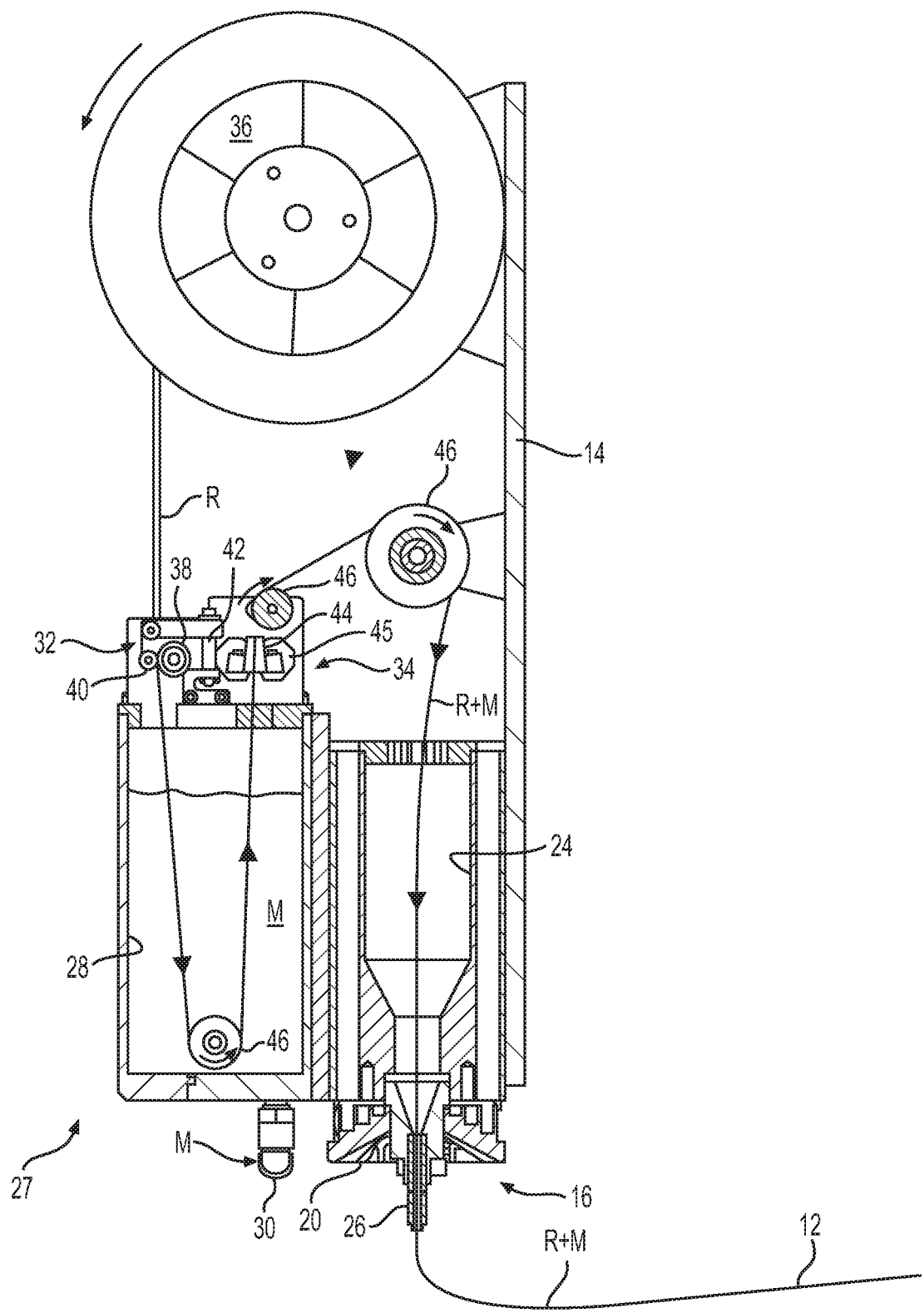
FIG. 2 is a diagrammatic illustration of an exemplary disclosed print head that may be utilized with the system of FIG. 1.

Any number of reinforcements (represented as "R") may be passed axially through head 16 and be discharged together with at least a partial coating of matrix (matrix represented as "M" in FIG. 2). At discharge (or shortly thereafter), one or more cure enhancers (e.g., one or more light sources, ultrasonic emitters, lasers, heaters, catalyst dispensers, microwave generators, etc.) 20 may expose the matrix coating to a cure energy (e.g., light energy, electromagnetic radiation, vibrations, heat, a chemical catalyst or hardener, or other form of actively-applied energy). The cure energy may trigger a chemical reaction, increase a rate of chemical reaction already occurring within the matrix, sinter the material, harden the material, or otherwise cause the material to cure as it discharges from head 16.

A controller 22 may be provided and communicatively coupled with support 14, head 16, and/or any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

A cross-section of an exemplary head 16 is disclosed in detail in FIG. 2. As shown in this figure, head 16 may include, among other things, a matrix reservoir 24 and an outlet (e.g., a nozzle) 26 removably connected to matrix reservoir 24. In this example, outlet 26 is a multi-channel nozzle configured to discharge composite material having a generally rectangular, flat, or ribbon-like cross-section. The configuration of head 16, however, may allow outlet 26 to be swapped out for another outlet 26 (not shown) that discharges composite material having a different shape (e.g., a circular cross-section, a tubular cross-section, etc.). Fibers, tubes, and/or other reinforcements may pass through matrix reservoir 24 and be wetted (e.g., at least partially coated and/or fully saturated) with matrix material prior to discharge.

It has been found that, in some applications, more time may be required for the matrix to fully saturate and/or encapsulate the associated reinforcement than is possible during travel of the reinforcement through matrix reservoir 24. In addition, it can be difficult to ensure that gravity does not cause the matrix to leak from reservoir 24 through outlet 26 in an uncontrolled manner. In these and other applications, the reinforcement may be selectively wetted or otherwise coated or saturated with the matrix at a location upstream of reservoir 24. Reservoir 24 may still be used in these applications, left empty, or completely omitted, as desired.

FIG. 2 illustrates a wetting mechanism ("mechanism") 27, which can be used together with or in place of reservoir 24. Mechanism 27 may be configured to receive reinforcement (e.g., a dry or pre-impregnated reinforcement from an internal and/or external spool 36) and matrix (e.g., via an inlet 30), and to discharge a matrix-wetted reinforcement, which can then be discharged by head 16 in the manner described above. Mechanism 27 may be a relatively closed and higher-pressure device or a relatively open and lower-pressure mechanism, as desired. For example, the supplied reinforcement may be routed through a bath of liquid matrix that is contained within mechanism 27.

Mechanism 27 may be an assembly of components that cooperate to saturate, coat, encapsulate, or at least partially wet the reinforcement passing therethrough with a desired amount of matrix, without significantly increasing tension within the reinforcement. These components may include, among other things, a matrix reservoir 28 that is in fluid communication with inlet 30, a feeder 32 that is configured to direct reinforcement into matrix reservoir 28, and a regulator 34 located at an exit of matrix reservoir 28 that is configured to limit an amount of matrix allowed to leave mechanism 27 with the reinforcement.

Matrix reservoir 28 may function similar to matrix reservoir 24 described above, but is located in substantial isolation from head 16 (e.g., isolated from outlet 26). That is, matrix reservoir 28 may not be internal to head 16, so as to reduce a likelihood of matrix material passing undetected and/or in undesired amounts through outlet 26. In the embodiment where the internal matrix reservoir 24 of head 16 is eliminated, the external wetting mechanism 27 may feed directly into a stand-alone outlet 26. In embodiments where matrix reservoir 24 is retained, matrix reservoir 24 may primarily be used to collect excess resin that drips from the reinforcement during passage through head 16. It is contemplated that matrix reservoir 24 could be used to apply additional matrix and/or a different matrix (e.g., a catalyst or outer coating) to the already wetted reinforcement. It is further contemplated that matrix reservoir 28 could be internal to head 16 (e.g., within the same housing), if desired.

It should be noted that matrix reservoir 28 may be substantially sealed (e.g., via one or more o-rings, gaskets, etc.—not shown), such that matrix reservoir 28 may be tilted or even completely inverted, without significant matrix leakage. It should also be noted that, although inlet 30 is shown as being located at a lowest gravitational point of matrix reservoir 28 (e.g., to allow for filling and draining via the same port), this location could be changed. Likewise, although a reinforcement inlet and a reinforcement exit are both shown as being located at higher gravitational points of matrix reservoir 28, these locations could also change. The current configuration allows for gravity to pull excess matrix from the exiting reinforcement back into matrix reservoir 28.

Matrix reservoir 28 may be manually and/or automatically filled with matrix. For example, when a periodic inspection of matrix reservoir 28 reveals a low-level status, additional matrix may be directed through inlet 30 (e.g., via opening of a valve and/or activation of a pump—both not shown). Alternatively, a sensor (e.g., a resistive level or acoustic sensor—not shown) may be used to automatically direct additional matrix through inlet 30 in response to a detected low-level status. In another embodiment, matrix may be directed through inlet 30 based on an assumed consumption rate, in addition to or instead of the other fill strategies disclosed above.

Feeder 32 may be located between a supply of reinforcement (e.g., spool) 36 and matrix reservoir 28 and configured to reduce tension within the reinforcement through outlet 26 by selectively pulling reinforcement from spool 36. In particular, when spool 36 is full of reinforcement, it may have a larger mass and associated inertia. If the reinforcement were to be pulled from spool 36 through outlet 26 simply by movement of head 16 away from anchor point 18, as described above, enough tension could be created within the reinforcement to disrupt anchor point 18 under some conditions, break the reinforcement, and/or cause uneven printing within structure 12. Accordingly, feeder 32 may selectively pull the reinforcement from spool 36 (and feed the reinforcement into matrix reservoir 28, in some applications) at rate that is about equal to a rate at which the fiber is discharging through outlet 26. Feeder 32 may include, among other things, at least one roller (e.g., two rollers 38 and 40 that are biased towards each other via a spring 42). One or both of rollers 38, 40 may have friction-increasing features (e.g., teeth) to help reduce slippage of the reinforcement through feeder 32, and/or be powered to rotate (e.g., by a motor—not shown).

In one example, feeder 32 may alternatively or additionally function as an encoder, monitoring usage of reinforcement by head 16 and/or an amount of reinforcement remaining on spool 36. In this example, at least one of rollers 38, 40 may include indexing elements (e.g., a slotted disk, an imbedded magnet, an optical stripe, etc.—shown only in FIG. 3) 41 that are detected by an associated sensor (e.g., an electronic eye, a camera, a hall-effect sensor, etc.—shown only in FIG. 3) 43. Based on a sensed number of revolutions of roller(s) 38, 40, an amount of reinforcement passing through feeder 32 may be determined. It should be noted that, although feeder 32 is shown as being located upstream of matrix reservoir 28, feeder 32 (or only indexing elements 41 and associated sensor 43) could alternatively be located downstream, if desired.

Matrix regulator 34 may be located at a reinforcement exit point of mechanism 27 and configured to mechanically remove excess matrix from the reinforcement passing therethrough. In the disclosed embodiment, matrix regulator 34 includes one or more wipers (e.g., two opposing wipers) 44 that engage the wetted reinforcement. Wipers 44 may be biased towards each other (e.g., via coil springs 45) to sandwich and/or flexible to deform around the reinforcement. Matrix reservoir 28 may be generally open to a lower side of wipers 44, such that removed matrix may be pulled by gravity back into reservoir 28 and reused. It should be noted that wipers 44, in addition to regulating an amount of matrix left clinging to the reinforcement, may also be used to induce a desired level of tension within the reinforcement, in some applications. For example, the spring rate of coil springs 45, the flexibility of wipers 44, and/or an engagement angle of wipers 44 may be selectively and/or actively adjusted to thereby adjust the tension level.

Any number of pulleys or other similar routing devices 46 may be arranged to help route the reinforcement along a desired path through wetting mechanism 27. For example, one or more routing devices 46 may be at least partially submerged inside matrix reservoir 28 at a location between feeder 32 and regulator 34. In another example, one or more routing devices 46 may be located outside of matrix reservoir 28 at locations between regulator 34 and outlet 26 (e.g., above matrix reservoir 24 and in axial alignment with outlet 26). Routing devices 46 may be driven or spin freely, as desired.

It should be noted that, although mechanism 27 is shown as being mounted to print head 16, which is in turn mounted to support 14, the reverse could be true. In addition, mechanism 27 could be mounted to support 14 completely independent of head 16, if desired. Likewise, instead of being located axially adjacent head 16, mechanism 27 could alternatively be located axially in line with head 16 (e.g., axially aligned with outlet 26). Other configurations may also be possible.

It is contemplated that feeder 32, when functioning as an encoder in the manner described above, may be utilized to determine when print head 16 and/or the manufacturing process has malfunctioned. Malfunctions experienced by print head 16 can include untacking of a path of discharged composite material (e.g., during cornering) and breaking of the reinforcement within the path. These malfunctions may be determined, for example, via a comparison of an actual amount (e.g., a length) of reinforcement passing through feeder 32 with an expected amount. In particular, when the actual amount is less than the expected amount (e.g., by at least a threshold margin), controller 22 may determine that either the reinforcement has become untacked from a remaining portion of structure 12 and is being towed through a shorter arc cutting across a desired corner or that the reinforcement has completely broken and is no longer being pulled out through outlet 26.

The expected amount of reinforcement passing through feeder 32 may be determined in any number of ways. For example, the expected amount may be determined based on progress of print head 16 through a tool path sequence and a known length of the sequence. In another example, the expected amount may be determined based on monitored movement of print head 16 away from anchor point 18. Other methods may also be utilized.

Once controller 22 determines that a malfunction has occurred, several actions may be responsively taken. For example, controller 22 may generate an alert indicating that the print process may have failed and that a technician should check the process. Additionally or alternatively, controller 22 may pause the process and await a confirmation from the technician that the process should continue. In some situations, controller 22 may cancel the process completely and, in some embodiments, restart the process.

It is contemplated that any of these above described responses may be selectively implemented based on a severity of the malfunction. For example, if the difference between the actual and expected reinforcement amounts is below a first threshold (e.g., indicating only that a corner may have been cut or cut by only a small amount), only the notification may be generated. While, if the difference is greater than the first threshold (e.g., indicating that the reinforcement may have broken), controller 22 may pause and/or cancel the process. Other responses may also be possible.

Figure 4:
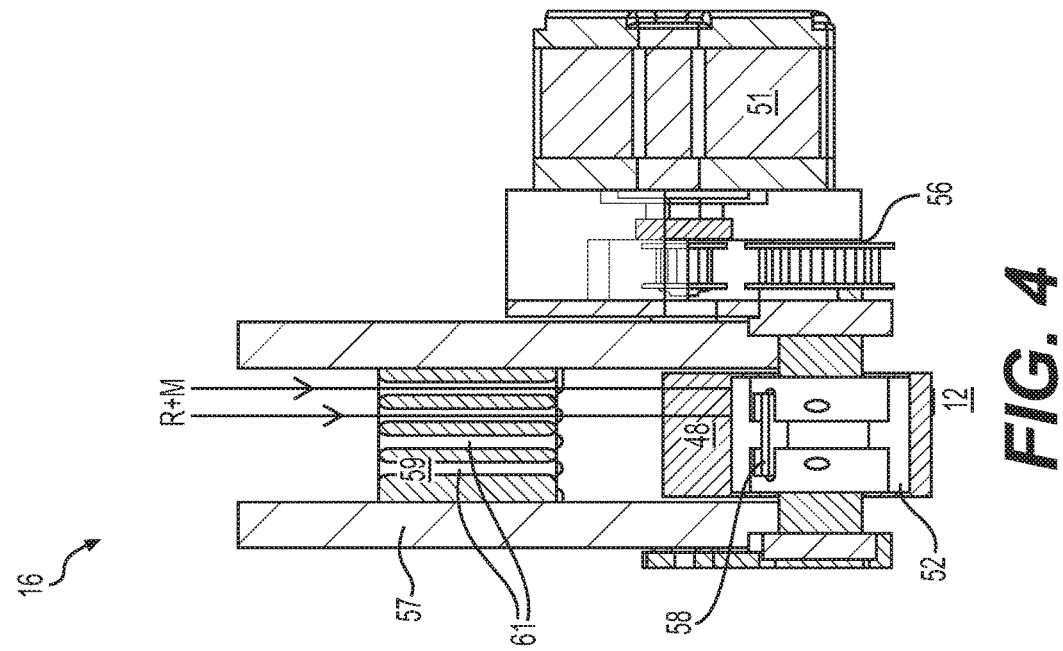
FIGS. 3 and 4 are diagrammatic illustrations of another exemplary disclosed print head that may be utilized with the system of FIG. 1.
Figure 3:
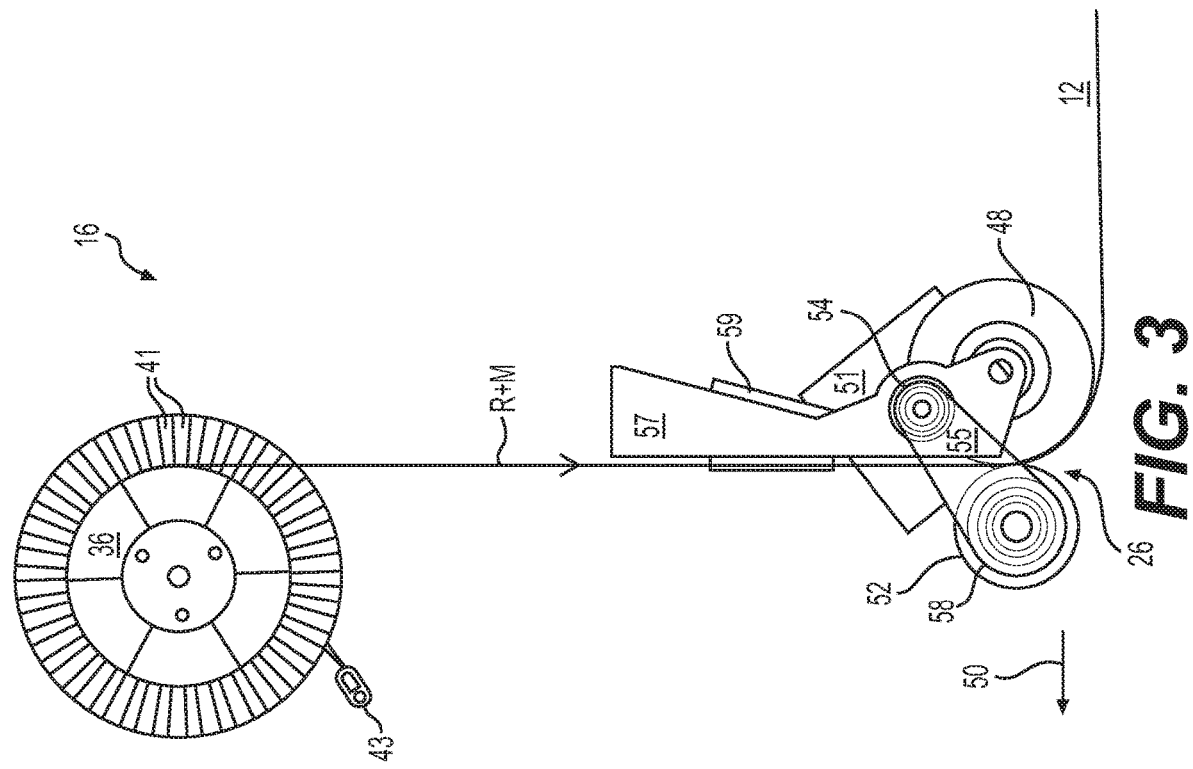

FIGS. 3 and 4 illustrate another exemplary head 16 that may be used with one or both of matrix reservoir 24 and mechanism 27 (referring to FIG. 2). In this example, outlet 26 may not resemble the nozzle shown in FIGS. 1 and 2. Instead, outlet 26 of FIGS. 3 and 4 may be associated with a trailing compactor 48 (i.e., trailing relative to a normal travel direction of head 16, as represented by an arrow 50) that functions as a tool-center-point of head 16.

Compactor 48 may be used to apply pressure to material discharged from head 16 via outlet 26. In addition, in some instances, compactor 48 may be driven to propel head 16 (e.g., via a motor 51) and/or selectively paired with another roller 52 to pull the reinforcement through outlet 26. In this way, less (if any) tension may be generated within the reinforcement outside of head 16 due to movement of head 16 away from anchor point 18 (referring to FIG. 1). This may allow for the residual level of tension within each individual reinforcement to be more accurately controlled.

In one example, roller 52 may be biased toward compactor 48 (e.g., via a coil spring 54 and a lever arm 55), such that the reinforcement(s) are sandwiched therebetween. Lever arm 55 may extend between compactor 48 and roller 52, with coil spring 45 being located at an end adjacent compactor 48. Roller 52 may be an idler-type of roller or, alternatively, may itself be driven (e.g., in addition to compactor 48 or instead of compactor 48 being driven) to rotate in a direction opposite that of compactor 48. For example, roller 52 may be operatively driven by motor 51 via a gear train 56 (shown only in FIG. 4), while compactor 48 is directly driven by motor 51. It is contemplated that a clutching mechanism (not shown) could be associated with gear train 56, such that roller 52 may only be selectively driven during driving of compactor 48 and/or so that compactor 48 may be driven at least partially independent of the rotation of roller 52.

A common mount 57 may be provided for compactor 48, roller 52, motor 51, and/or gear train 56. Mount 57 may include, among other things, protruding arms 57*a* that extend to opposing ends of compactor 48 and roller 52, one of arms 57*a* being located between one of the ends and motor 51 and gear train 56. A guide 59 may be connected to mount 57 at a location upstream of compactor 48. Guide 59 may have one or more guiding features (e.g., grooves, channels, ribs, dividers, etc.) 61 that help to guide (e.g., align, separate, converge, shape, etc.) the reinforcements to compactor 48.

As shown in FIGS. 3 and 4, a cutting mechanism 58 may be integrated into roller 52. In these examples, cutting mechanism 58 embodies a blade that is normally recessed within roller 52, such that the blade does not engage the reinforcements during normal discharge. At select timings, the blade may be pushed radially outward to protrude through or from an outer surface of roller 52, thereby allowing the rotation of roller 52 to force the blade through the reinforcements and against a compliant outer surface of compactor 48. It is contemplated that the outer surface of compactor 48 may require periodic replacement and/or that a replaceable sleeve (not shown) may be positioned over compactor 48 to ensure that a desired texture of the deposited material is maintained.

In one example, the blade of cutting mechanism 58 may be pushed radially outward by fluid pressure. For example, an internal bladder, piston, or other actuator (not shown) may be selectively filled and drained of pressurized air, oil, or another fluid to force the blade to slide outward (e.g., within side-located guides) or be retracted, as needed. It is contemplated that cutting mechanism 58 could alternatively be located inside of compactor 48 and selectively pushed radially outward toward roller 52, if desired.

In another example, the blade of cutting mechanism 58 may permanently protrude from roller 52. In this example, roller 52 may selectively engage compactor 48 (e.g., via controlled swinging of lever arm 55) only when cutting is desired.

It can be important, in some applications, to ensure that severing of the reinforcement by cutting mechanism 58 has completed successfully, before subsequent operations are initiated. An exemplary arrangement that provides this confirmation is illustrated in FIG. 3. As seen in this figure, spool 36 (or an idler or feeder 32 located between spool 36 and compactor 48—shown only in FIG. 2) may be fitted with indexing elements 41, and sensor 43 placed in close proximity. At this location, sensor 43 may be configured to generate signals directed to controller 22 that are indicative of reinforcement payout (e.g., of rotation of spool 36), and controller 22 may utilize the signals to determine if reinforcement is being pulled from head 16 at a time when no reinforcement should be discharging from outlet 26. For example, after severing of the reinforcement by cutting mechanism 58 and during movement and/or restart of a new track of material, the reinforcement should not be paying out from spool 36 or discharging from outlet 26. However, if the reinforcement was not successfully severed and head 16 attempts to move away from the severing location, the remaining attachment to structure 12 might cause the reinforcement to be inadvertently pulled from head 16. Sensor 43 may generate signals indicative of this undesired payout, and controller 22 may respond in any number of different ways. For example, controller 22 may cause movement of head 16 to halt (e.g., via corresponding signals directed to support 14—referring to FIG. 1), generate an error flag, shut down system 10, cause cutting mechanism 58 to reattempt severing of the reinforcement, and/or implement another corrective action.

INDUSTRIAL APPLICABILITY

The disclosed systems may be used to additively manufacture composite structures having any desired cross-sectional shape and length. The composite structures may include any number of different fibers of the same or different types and of the same or different cross-sectional sizes and shapes, and any number of different matrixes of the same or different makeup. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, reinforcement information (e.g., types, sizes, shapes, performance characteristics, densities, and trajectories), matrix information (e.g., type, cure requirements, performance characteristics), etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10.

To install the reinforcements, individual fibers, tows, and/or ribbons may be passed through head 16 (e.g., through reservoir 24 and/or reservoir 28, and outlet 26). In some embodiments, the reinforcements may additional be passed between roller 52 and compactor 48 (referring to FIGS. 3 and 4) and/or attached to anchor point 18. Installation of the matrix material may include filling matrix reservoir(s) 24 and/or 28, and/or coupling of an extruder (not shown) to head 16.

The component information may then be used to control operation of system 10. For example, particular reinforcements may be pulled and/or pushed along with a particular matrix material from head 16 in desired amounts and/or at desired rates. Support 14 may also selectively move head 16 and/or anchor point 18 in a desired manner, such that an axis of the resulting structure 12 follows a desired three-dimensional trajectory. Cure enhancer(s) 20 may be selectively activated during material discharge, such that the matrix cures at least enough to maintain a shape of structure 12. Once structure 12 has grown to a desired length, structure 12 may be severed from system 10 via cutting mechanism 58.

The disclosed system may have improved reinforcement wetting and management. Wetting may be improved via precise control over the matrix within a separate and upstream mechanism that is at least partially isolated from (e.g., not axially aligned with) outlet 26. Reinforcement management may be improved by monitoring reinforcement travel through head 16 (e.g., fiber payout), and selectively responding with corrective actions based on a comparison with travel of head 16 caused by support 14.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for additively manufacturing a composite structure, comprising:
   a support;
   a print head connected to and moveable by the support;
   a sensor configured to generate a signal indicative of a first amount of material discharged from the print head;
   a wetting mechanism disposed within the print head, the wetting mechanism configured to wet the material with a liquid matrix prior to discharge of the material from the print head; and
   a controller in communication with the sensor, the controller being configured to:
      determine a second amount of material expected to be discharged from the print head,
      determine a difference between the first amount of material and the second amount of material, and
      determine a corrective action based at least in part on the difference.

2. The system of claim 1, wherein:
the controller is further configured to determine a travel distance of the print head; and
the second amount is determined based at least in part on the travel distance of the print head.

3. The system of claim 2, wherein the controller is configured to determine that at least one of untacking or breakage of the material has occurred based at least in part on the first amount of material being less than the second amount of material.

4. The system of claim 2, further including a cutting mechanism configured to sever the material discharged from the print head, wherein the controller is configured to determine that severing of the material by the cutting mechanism has failed based at least in part on the first amount of material being greater than the second amount of material.

5. The system of claim 4, wherein the corrective action includes causing the cutting mechanism to attempt an additional severing operation to sever the material.

6. The system of claim 1, wherein the corrective action includes at least one of generating a flag indicating a potential malfunction, pausing of a current printing operation, or cancelling the current printing operation.

7. The system of claim 1, further including a cure enhancer mounted to the print head and configured to expose the material discharging from the print head to cure energy.

8. The system of claim 1, wherein the wetting mechanism includes:
a reservoir;
a feeder located upstream of the reservoir at a first end; and
a routing device located inside of the reservoir at a second end, the routing device configured to be submerged in the liquid matrix during operation of the print head.

9. The system of claim 8, wherein the wetting mechanism further includes a regulator configured to limit an amount of the liquid matrix deposited on the material.

10. The system of claim 8, wherein the sensor is associated with the feeder.

11. The system of claim 1, further including a spool configured to supply the print head with the material, wherein the sensor is associated with the spool.

12. The system of claim 1, wherein:
the controller is configured to receive an indication indicative of a tacking operation in which the material is secured to a surface; and
the controller is configured to determine, based at least in part on the indication, that the second amount of material is greater than zero.

13. A system for additively manufacturing a composite structure, comprising:
a support;
a print head connected to and moveable by the support;
a sensor configured to generate a signal indicative of a first amount of continuous reinforcement passing through the print head;
a wetting mechanism configured to apply a matrix to the continuous reinforcement at a location within the print head; and
a controller in communication with the support and the sensor, the controller being configured to:
determine a travel distance of the print head;
determine, based at least in part on the travel distance, a second amount of the continuous reinforcement expected to be passing through the print head; and
based at least in part on the first amount being less the second amount, at least one of:
generating a notification indicative of a potential malfunction of the print head;
pausing a process of the print head;
cancelling the process; or
restarting the process.

14. The system of claim 13, further including a cutting mechanism configured to sever the continuous reinforcement, wherein:
the controller is in further communication with the cutting mechanism; and
the controller is further configured to selectively cause the cutting mechanism to sever the continuous reinforcement based at least in part on the first amount of the continuous reinforcement being greater than the second amount of the continuous reinforcement.

15. The system of claim 13, wherein:
the second amount of the continuous reinforcement is zero based on a cutting operation of the system; and
the second amount of the continuous reinforcement expected to be passing through the print head is greater than zero after a taking operation of the system.

16. The system of claim 13, further comprising a cure enhancer configured to apply a cure energy to the matrix coating the continuous reinforcement.

17. A system for additively manufacturing a composite structure, comprising:
a support;
a print head connected to and moveable by the support;
a sensor configured to generate a signal indicative of an amount of material discharging from the print head during movement of the print head;
a controller in communication with the support and the sensor, the controller being configured to:
determine a movement distance of the print head during discharging; and
selectively implement a corrective action based at least in part on the movement distance and the amount of material.

18. The system of claim 17, wherein:
the controller is further configured to:
determine that the amount of material passing through the print head is less than the movement distance of the print head, and
determine that at least one of untacking or breakage of the material has occurred based at least in part on the amount of material being less than the movement distance; and
the corrective action includes at least one of:
generating a flag indicating that a malfunction has occurred,
pausing of a current printing operation, or
cancelling of the current printing operation.

19. The system of claim 17, further including a cutting mechanism configured to sever the material passing through the print head, wherein:
the controller is further configured to:
determine that the amount of material passing through the print head is greater than the movement distance of the print head and
determine that a severing operation of the material by the cutting mechanism has failed; and
the corrective action includes causing the cutting mechanism to attempt an additional severing operation of the material.

20. The system of claim 17, further comprising a wetting module connected to and moveable by the print head, the wetting module configured to wet the material with a liquid matrix, wherein the sensor is located between the wetting module and a spool onto which the material is wound.

\* \* \* \* \*